US008422736B2

(12) United States Patent
Kmiecik et al.

(10) Patent No.: US 8,422,736 B2
(45) Date of Patent: Apr. 16, 2013

(54) METHOD OF AND APPARATUS FOR PRODUCING LANE INFORMATION (75) Inventors: Marcin Michal Kmiecik, Lodz (PL); Lukasz Piotr Taborowski, Lask (PL)

(73) Assignee: TomTom Global Content B.V., Eindhoven (NL)

( * ) Notice: Subject to any disclaimer, the term of this patent is extended or adjusted under 35 U.S.C. 154(b) by 399 days.

(21) Appl. No.: 12/734,118

(22) PCT Filed: Nov. 16, 2007

(86) PCT No.: PCT/NL2007/050569
§ 371 (c)(1), (2), (4) Date: May 27, 2010

(87) PCT Pub. No.: WO2009/064172
PCT Pub. Date: May 22, 2009

(65) Prior Publication Data
US 2010/0266161 A1    Oct. 21, 2010

(51) Int. Cl.
*G06K 9/00* (2006.01)
(52) U.S. Cl.
USPC .............................. 382/103; 382/104; 382/113
(58) Field of Classification Search .................. None
See application file for complete search history.

(56) References Cited

U.S. PATENT DOCUMENTS

| | | | | |
|---|---|---|---|---|
| 6,526,352 | B1 * | 2/2003 | Breed et al. | 701/470 |
| 6,640,008 | B1 | 10/2003 | Lee et al. | |
| 7,511,734 | B2 * | 3/2009 | Ozaki | 348/148 |
| 2007/0168113 | A1 * | 7/2007 | Litkouhi et al. | 701/200 |

FOREIGN PATENT DOCUMENTS

| | | |
|---|---|---|
| WO | WO 2008/044911 | 4/2008 |
| WO | WO 2008/130219 | 10/2008 |

OTHER PUBLICATIONS

Gi-Hong Kim; Hong-Gyoo Sohn; and Yeong-Sun Song, "Road Infrastructure Data Acquisition Using a Vehicle-Based Mobile Mapping System", 2006, Computer-Aided Civil and Infrastructure Engineering 21, pp. 346-356.*
International Preliminary Report on Patentability dated May 27, 2010.
Baozhen Fan et al., "Preprocessing Algorithms for Automatic DNA Sequence Reading," IEEE Tencon, 1993, pp. 998-1001.
Joel C. McCall et al., "An Integrated, Robust Approach to Lane Marking Detection and Lane Tracking," IEEE Intelligent Vehicles Symposium, Jun. 14-17, 2004, pp. 533-537.
Nikolaos Bellas et al., "FPGA implementation of a license plate recognition SoC using automatically generated streaming accelerators," IEEE, 2006.
Gang Yi Jiang et al., "Lane and Obstacle Detection Based on Fast Inverse Perspective Mapping Algorithm," IEEE, 2000, pp. 2969-2974.
Massimo Bertozzi et al., "GOLD: A Parallel Real-Time Stereo Vision System for Generic Obstacle and Lane Detection," IEEE Transactions on Image Processing, vol. 7, No. 1, Jan. 1998, pp. 62-70.
GOLD: A Parallel Real-Time Stereo Vision System for Generic Obstacle and Lane Detection, Massimo Bertozzi, et al, IEEE Transactions on Image Processing, vol. 7, No. 1, Jan. 1998.
International Search Report.

* cited by examiner

*Primary Examiner* — Andrew W Johns
*Assistant Examiner* — Siamak Harandi

(57) ABSTRACT

A method of producing lane information for use in a map database is disclosed. In at least one embodiment, the method includes acquiring one or more source images of a road surface and associated position and orientation data, the road having a direction and lane markings parallel to the direction of the road; acquiring road information representative of the direction of said road; transforming the one or more source images to obtain a transformed image in dependence of the road information, wherein each column of pixels of the transformed image corresponds to a surface parallel to the direction of said road; applying a filter with asymmetrical mask on the transformed image to obtain a filtered image; and producing lane information from the filtered image in dependence of the position and orientation data associated with the one or more source images.

21 Claims, 8 Drawing Sheets

METHOD OF AND APPARATUS FOR PRODUCING LANE INFORMATION

FIELD OF THE INVENTION

The present invention relates to a method for producing lane information for use in a map database. The invention further relates to an apparatus for producing lane information, a computer program product and a processor readable medium carrying said computer program product.

PRIOR ART

There is a need to collect a large number of horizontal road information e.g. lane dividers, road centrelines, road width etc. for digital map databases used in navigation systems and the like. The geo-position of the road information could be stored as absolute or relative position information. For example, the centreline could be stored with absolute geo-position information and the road width could be stored with relative position information, which is relative with respect to the absolute geo-position of the centreline. The road information could be obtained by interpreting high resolution aerial orthorectified images. An orthorectified image is a "scale corrected" image, depicting ground features as seen from above in their corrected ground positions, in which distortion caused by camera and flight characteristics and relief displacement has been removed using photogrammetric techniques. An orthorectified image is a kind of aerial photograph that has been geometrically corrected ("orthorectified") such that the scale of the photograph is uniform, meaning that the photograph can be considered equivalent to a map. An orthorectified image can be used to measure true distances, because it is an accurate representation of the earth's surface, having been adjusted for topographic relief, lens distortion, and camera tilt. Orthorectified views differ from perspective views in that orthorectified views project at a right angle to a reference plane, whereas perspective views project from the surface onto the reference plane from a single fixed position or viewpoint. An orthorectified image can be obtained by any suitable map projection. The map projection can be a projection by surface, such as cylindrical, pseudocylindrical, hybrid, conical, pseudoconical or azimuthal. The projection can also be a projection by preservation of a metric property. The map projections have in common that they are orthogonal projections, which means that every pixel represents a point on the surface of the reference plane (ellipsoid that approximates the shape of the earth) seen along a line perpendicular to that surface. Thus, every pixel of an orthorectified image of the earth surface substantially corresponds to a view of the earth surface seen along a line perpendicular to the ellipsoid that approximates the shape of the earth.

In addition to the projection constraints above, an orthorectified image comprises metadata enabling an algorithm to reference any pixel of the orthorectified image to a point in the geographic coordinate reference system. The exact position of each pixel on the ellipsoid that approximates the shape of the earth is known. Therefore, the position and size of ground features, e.g. horizontal road information, can be retrieved from an orthorectified image and highly accurate distances and earth coordinates can be computed. The metadata of a geo-coded orthorectified image defines the projected coordinate reference system to determine for each pixel the corresponding position in that geographic coordinate reference system.

A geo-coded orthorectified image shows the road surface with, if present, the road markings. Image processing algorithms enables us to detect the road markings and to determine the corresponding pixels. The metadata enables us to determined accurately the position of the road markings in the geographic coordinate reference system.

Such high resolution aerial orthorectified images should have a pixel size below 25 cm. It is very expensive to obtain such images and there is no guarantee that all the road horizontal information is captured.

Orthorectified images can be obtained from aerial images. However, errors are often introduced, which can result in inaccurate mapping of the geo-position data. The main problem is that normally aerial images are not taken exactly perpendicular to the surface of the earth. Even when a picture is taken close to that it is only the center of the picture that is exactly perpendicular. In order to orthorectify such an image, height-of-terrain information must be additionally obtained. The accuracy can be improved by taking overlapping images and comparing the same surface obtained from subsequent images from the same aerial camera. But still, there is a limit to the accuracy obtained vs. the extra cost. It should be noted that aerial orthorectified images could be a mosaic of top-view images.

Furthermore, to obtain the "horizontal" road information from aerial orthorectified images, the images have to be analysed. In the images the road surface has to be detected. As the geo-positions associated with aerial orthorectified images and the geo-positions in a map data base has been obtained from different position determining devices, the geo-position of a road in a map database can not always be used directly to determine accurately where a road surface is located in the orthorectified image.

Nowadays, "vertical" road information, e.g. speed limits, directions signposts etc. for digital map databases used in navigation systems and the like, can be obtained by analysing and interpreting horizontal picture images and other data collected by a earth-bound mobile collection device. The term "vertical" indicates that an information plane of the road information is generally parallel to the gravity vector. Mobile mapping vehicles which are terrestrial based vehicles, such as a car or van, are used to collect mobile data for enhancement of digital map databases. Examples of enhancements are the location of traffic signs, route signs, traffic lights, street signs showing the name of the street etc.

The mobile mapping vehicles have a number of cameras, some of them stereographic and all of them are accurately geo-positioned as a result of the vehicle having an onboard positioning system (e.g. a precision GPS receiver) and other position determination equipment (e.g. Inertial Navigation System—INS) onboard. While driving the road network, geo-coded image sequences are being captured. These can be either video or still picture images. Geo-coded means that a position, associated with the image is attached to the metadata of that image. In the present invention that position is derived from the position determination system of the vehicle which includes a GPS receiver and possibly INS, and possibly distance and heading measurement devices.

The mobile mapping vehicles record more then one image in an image sequence of an object, e.g. a building or road surface, and for each image of an image sequence the geo-position and orientation with reference to a coordinate reference system is accurately determined. Image sequences with corresponding geo-position and orientation information will be referred to as geo-coded image sequences. As the images sequences obtained by a camera represent a visual perspective view of the 'horizontal" road information, image processing algorithms might provide a solution to extract the road information from the image sequences. The geo-positions of the cameras are accurately known by means of the onboard positioning system (e.g. a GPS receiver) and other additional position and orientation determination equipment (e.g. Inertial Navigation System—INS).

In both the aerial images and image sequences captured by a mobile mapping vehicle, the lane information is present. By means of complex image processing algorithms, the lane information can be detected and the corresponding position information can be determined.

SUMMARY OF THE INVENTION

The present invention seeks to provide an improved method of producing lane information for use in a map database.

According to the present invention, the method comprises:

acquiring one or more source images of a road surface and associated position and orientation data, the road having a direction and lane markings parallel to the direction of the road;

acquiring road information of representative of the direction of said road;

transforming the one or more source images to obtain a transformed image in dependence of the road information, wherein each column of pixels of the transformed image corresponds to a surface parallel to the direction of said road;

applying a filter with asymmetrical mask on the transformed image to obtain a filtered image; and, producing lane information from the filtered image in dependence of the position and orientation data associated with the one or more source images.

The invention is based on the recognition that the information of the position and direction of a road can easily be obtained from digital map databases. Furthermore, the position and orientation of a road can be easily obtained from a mobile mapping vehicle which drives on a road. The direction of a vehicle driving on a road is more or less parallel to the direction of the road. Furthermore, lane markings, such as lane dividers which are linear markings painted on the road surface, are markings parallel to the direction of the road. Nowadays, geo-coded images, which can be top view or orthorectified view images, are publicly available wherein for each pixel the geo-position is known in a predefined coordinate system. Geo-coded images can be aerial or satellite images. The one or more source images could also be source images that have been obtained by retrieving one or more image sequences obtained by means of a terrestrial based camera mounted on a moving vehicle driving on the road and associated position and orientation data and performing a normalization process on the one or more image sequences to obtain the one or more images and associated position and orientation data. The normalization process could include an orthorectification process.

To enhance the extraction of lane information, the source images are filtered. The enhancement improves the detection rate of the objects to be detected. Commonly known filters such as noise filters, morphological filters and edge filters can be used to enhance the extraction. However, as the orientation of the linear objects is not know in the source images, the filters have to be orientation invariant filters. These filters are symmetrical filters with two dimensions, which perform a function simultaneously in two directions. However, when the orientation of the linear objects to be detected is known, filters which operate in only one dimension can be used.

These filters have a reduced number of parameters. Consequently, less computing power is needed to execute such a filter. Furthermore, if the orientation and form of an object is known, more simple shape detection algorithms can be used, as the shape filter has to detect only objects with the known orientation in the image. Therefore, according to the invention prior to extraction of the lane information from the source images, the road direction is used to obtain an image wherein each column of pixels is parallel to the road direction. Accordingly, the linear lane markings will have a vertical orientation in the images. This allows us to use filters on the transformed images with a function in only one dimension to enhance the images, for example by emphasizing features of the lane information. These filters are called asymmetrical filters as they perform a filtering on the image in only one direction. Examples of emphasizing features in images through filtering are; reduction of image noise, magnification of the width of the linear road marking and removal or suppression of unneeded image information. After the image is filtered, standard feature extraction techniques can be used to detect the linear lane paintings. Furthermore, by knowing the orientation of the linear objects to be detected, more efficient emphasizing filters can be designed.

In an embodiment of the invention, the tracking information and the associated position and orientation information of the one or more image sequences have been captured simultaneously from an output signal generated by a position determination means mounted in the moving vehicle. This feature improves the relative accuracy of the position information of the produced lane information. The position and orientation of the vehicle is determined by means of a positioning determination device, which could include a GPS receiver and an inertial measuring device, such as one or more gyroscopes and/or accelerometers. As the distance between the terrestrial based camera and the recorded earth surface is limited and the geo-position of the camera is accurately known by means of an onboard positioning system (e.g. a GPS receiver) and other additional position and orientation determination equipment (e.g. Inertial Navigation System—INS), the absolute geo-position of each pixel assumed that the pixel is a representation of the earth surface can accurately be determined. This enables algorithms as disclosed in unpublished patent application PCT/NL2006/050252 to generate very accurately orthorectified images and associated position and orientation data. A typical mobile mapping system (MMS) produces an orthorectified mosaic or image that has a 8 cm resolution with an relative accuracy along 100 m of 50 cm and an absolute accuracy of 200 cm. The accurate position and orientation data enables us to transform the orthorectified images such that each column of pixels of the transformed image corresponds to a surface parallel to the direction of said road. It should be noted that the transformation could be optional if the orthorectification process produces images in which each column is already parallel to the driving direction of the vehicle.

In an embodiment of the invention, transforming includes a rotation operation. Image rotation is a simple function used to align orthorectified or top view images such that a column of pixels corresponds to a line on the earth surface parallel to the derived direction of the road.

In an embodiment of the invention, applying a filter with asymmetrical mask comprises:

applying firstly on the transformed image a first filter having a structuring element which enlarges the width of a line in a direction perpendicular to the driving direction of the vehicle and secondly a second filter having a structuring element which reduces the length of a line in a direction parallel to the driving direction of the vehicle.

In a further embodiment of the invention the first filter is a maximum filter and the second filter is a minimum filter. These are very simple filters to enlarge the width of an object and to reduce the length of an object.

In a further embodiment of the invention applying a filter with asymmetrical mask further comprises:

applying thirdly a third filter having a structuring element which enlarges the length of a line in a direction parallel to the driving direction to their original size. In an advantageous embodiment the third filter is a maximum filter. These features allow us to restore the length of an object to its original size, which enables us to determine accurately the length of each segment of a dashed line.

In an embodiment of the invention producing lane information comprises:

searching for a solid line in the filtered image; and,
calculating the position of the solid line in dependence of the position and orientation data associated with the one or more source images. In an exemplar embodiment producing lane information comprises:
searching for a rectangle in the filtered image; and,
calculating the position of the rectangle in dependence of the position and orientation data associated with the one or more source images.

The present invention can be implemented using software, hardware, or a combination of software and hardware. When all or portions of the present invention are implemented in software, that software can reside on a processor readable storage medium. Examples of appropriate processor readable storage medium include a floppy disk, hard disk, CD ROM, DVD, memory IC, etc. When the system includes hardware, the hardware may include an output device (e.g. a monitor, speaker or printer), an input device (e.g. a keyboard, pointing device and/or a microphone), and a processor in communication with the output device and processor readable storage medium in communication with the processor. The processor readable storage medium stores code capable of programming the processor to perform the actions to implement the present invention. The process of the present invention can also be implemented on a server that can be accessed over telephone lines or other network or internet connection.

SHORT DESCRIPTION OF DRAWINGS

The present invention will be discussed in more detail below, using a number of exemplary embodiments, with reference to the attached drawings that are intended to illustrate the invention but not to limit its scope which is defined by the annexed claims and its equivalent embodiment, in which

DETAILED DESCRIPTION OF EXEMPLARY EMBODIMENTS

Figure 1:
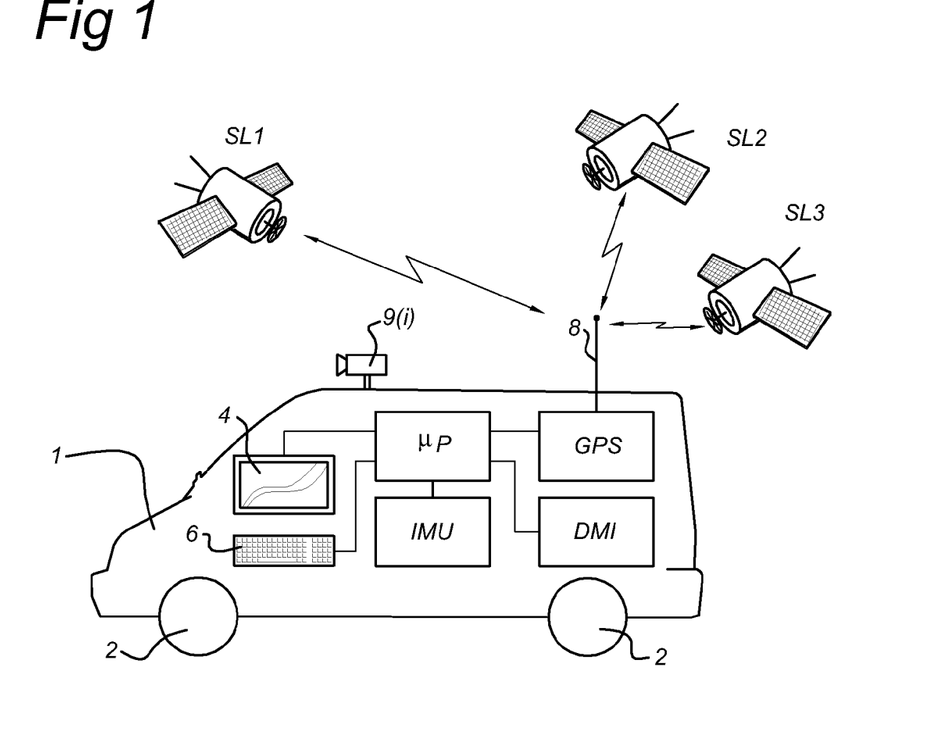
FIG. 1 shows a MMS system with a camera.

FIG. 1 shows a MMS system that takes the form of a car 1. The car 1 is provided with one or more cameras 9 (i), i=1, 2, 3, . . . I. The car 1 can be driven by a driver along roads of interest.

The car 1 is provided with a plurality of wheels 2. Moreover, the car 1 is provided with a high accuracy position determination device. As shown in FIG. 1, the position determination device comprises the following components:

a GPS (global positioning system) unit connected to an antenna 8 and arranged to communicate with a plurality of satellites SLi (i=1, 2, 3, . . . ) and to calculate a position signal from signals received from the satellites SLi. The GPS unit is connected to a microprocessor µP. Based on the signals received from the GPS unit, the microprocessor µP may determine suitable display signals to be displayed on a monitor 4 in the car 1, informing the driver where the car is located and possibly in what direction it is traveling. Instead of a GPS unit a differential GPS unit could be used. Differential Global Positioning System (DGPS) is an enhancement to Global Positioning System (GPS) that uses a network of fixed ground based reference stations to broadcast the difference between the positions indicated by the satellite systems and the known fixed positions. These stations broadcast the difference between the measured satellite pseudoranges and actual (internally computed) pseudoranges, and receiver stations may correct their pseudoranges by the same amount.

a DMI (Distance Measurement Instrument). This instrument is an odometer that measures a distance traveled by the car 1 by sensing the number of rotations of one or more of the wheels 2. The DMI is also connected to the microprocessor µP to allow the microprocessor µP to take the distance as measured by the DMI into account while calculating the display signal from the output signal from the GPS unit.

an IMU (Inertial Measurement Unit). Such an IMU can be implemented as 3 gyro units arranged to measure rotational accelerations and translational accelerations along 3 orthogonal directions. The IMU is also connected to the microprocessor µP to allow the microprocessor µP to take the measurements by the DMI into account while calculating the display signal from the output signal from the GPS unit. The IMU could also comprise dead reckoning sensors.

The system as shown in FIG. 1 is a so-called "mobile mapping system" which collect geographic data, for instance by taking pictures with one or more camera(s) 9(i) mounted on the car 1. The camera(s) are connected to the microprocessor µP. The camera(s) 9(i) in front of the car could be a stereoscopic camera. The camera(s) could be arranged to generate an image sequence wherein the images have been captured with a predefined frame rate. In an exemplary embodiment one or more of the camera(s) are still picture cameras arranged to capture a picture every predefined displacement of the car 1 or every interval of time. The predefined displacement is chosen such that two subsequent pictures comprise a similar part of the road surface. For example a picture could be captured after each 8 meters of travel.

It is a general desire to provide as accurate as possible location and orientation measurement from the 3 measurement units: GPS, IMU and DMI. These location and orientation data are measured while the camera(s) 9(i) take pictures. The pictures are stored for later use in a suitable memory of the μP in association with corresponding location and orientation data of the car 1, collected at the same time these pictures were taken. The pictures include information as to lane information, such as center of road, road surface edges and road width.

Figure 2:
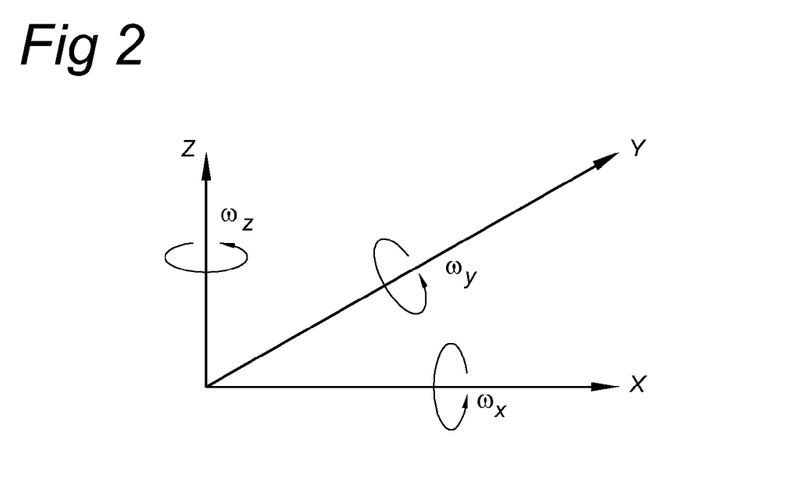
FIG. 2 shows a diagram of location and orientation parameters.

FIG. 2 shows which position signals can be obtained from the three measurement units GPS, DMI and IMU shown in FIG. 1. FIG. 2 shows that the microprocessor μP is arranged to calculate 6 different parameters, i.e., 3 distance parameters x, y, z relative to an origin in a predetermined coordinate system and 3 angle parameters $\omega_x$, $\omega_y$, and $\omega_z$, respectively, which denote a rotation about the x-axis, y-axis and z-axis respectively. The z-direction coincides with the direction of the gravity vector. The global UTM coordinate system could be used as predetermined coordinate system.

The microprocessor μP in the car 1 and memory may be implemented as a computer arrangement. An example of such a computer arrangement is shown in FIG. 3.

Figure 3:
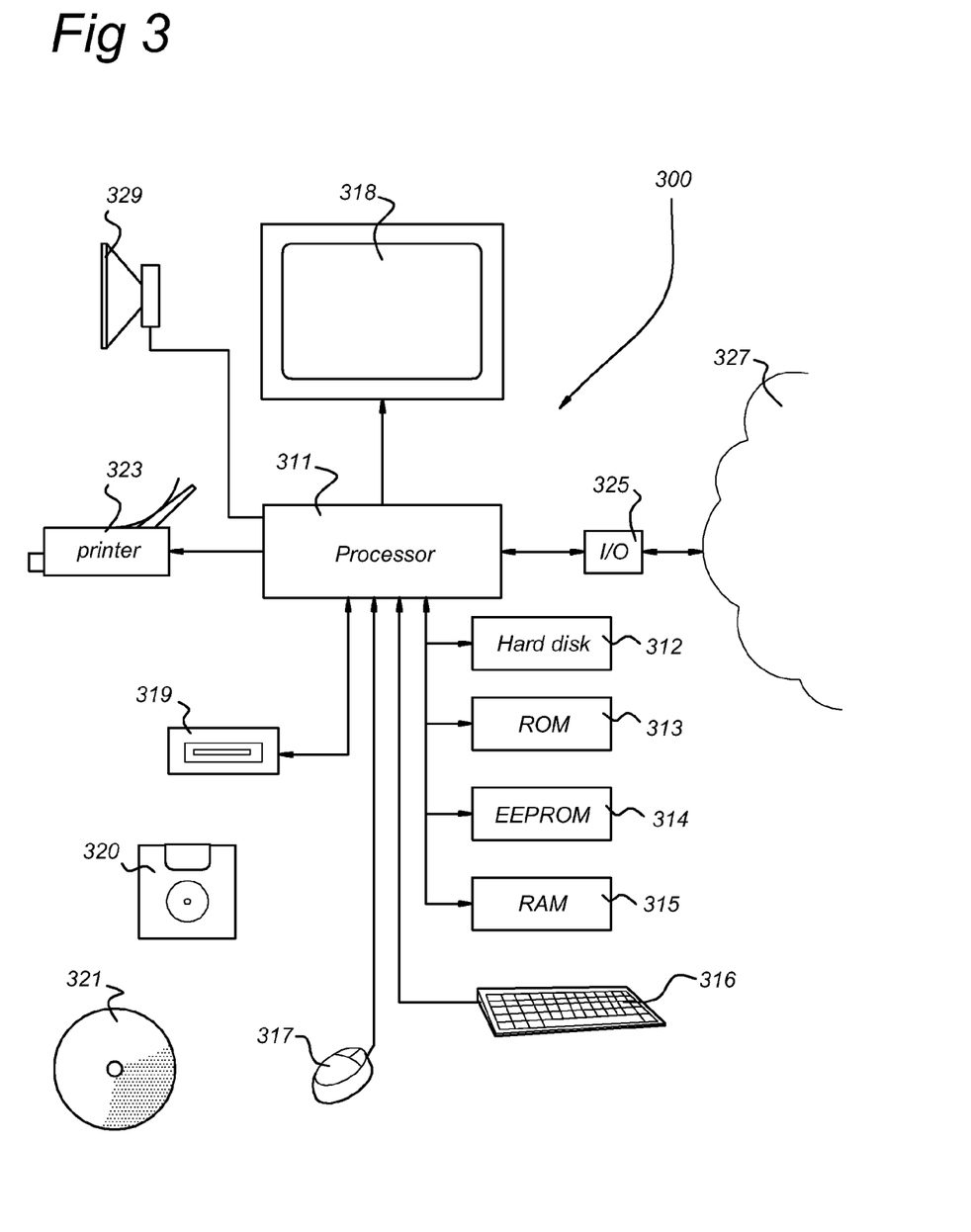
FIG. 3 shows a block diagram of a computer arrangement with which the invention can be performed.

In FIG. 3, an overview is given of a computer arrangement 300 comprising a processor 311 for carrying out arithmetic operations. In the embodiment shown in FIG. 1, the processor would be the microprocessor μP.

The processor 311 is connected to a plurality of memory components, including a hard disk 312, Read Only Memory (ROM) 313, Electrical Erasable Programmable Read Only Memory (EEPROM) 314, and Random Access Memory (RAM) 315. Not all of these memory types need necessarily be provided. Moreover, these memory components need not be located physically close to the processor 311 but may be located remote from the processor 311.

The processor 311 is also connected to means for inputting instructions, data etc. by a user, like a keyboard 316, and a mouse 317. Other input means, such as a touch screen, a track ball and/or a voice converter, known to persons skilled in the art may be provided too.

A reading unit 319 connected to the processor 311 is provided. The reading unit 319 is arranged to read data from and possibly write data on a removable data carrier or removable storage medium, like a floppy disk 320 or a CDROM 321. Other removable data carriers may be tapes, DVD, CD-R, DVD-R, memory sticks etc. as is known to persons skilled in the art.

The processor 311 may be connected to a printer 323 for printing output data on paper, as well as to a display 318, for instance, a monitor or LCD (liquid Crystal Display) screen, or any other type of display known to persons skilled in the art.

The processor 311 may be connected to a loudspeaker 329.

Furthermore, the processor 311 may be connected to a communication network 327, for instance, the Public Switched Telephone Network (PSTN), a Local Area Network (LAN), a Wide Area Network (WAN), the Internet etc by means of I/O means 325. The processor 311 may be arranged to communicate with other communication arrangements through the network 327.

The data carrier 320, 321 may comprise a computer program product in the form of data and instructions arranged to provide the processor with the capacity to perform a method in accordance to the invention. However, such computer program product may, alternatively, be downloaded via the telecommunication network 327.

The processor 311 may be implemented as a stand alone system, or as a plurality of parallel operating processors each arranged to carry out subtasks of a larger computer program, or as one or more main processors with several sub-processors. Parts of the functionality of the invention may even be carried out by remote processors communicating with processor 311 through the telecommunication network 327.

The components contained in the computer system of FIG. 3 are those typically found in general purpose computer systems, and are intended to represent a broad category of such computer components that are well known in the art.

Thus, the computer system of FIG. 3 can be a personal computer, workstation, minicomputer, mainframe computer, etc. The computer can also include different bus configurations, networked platforms, multi-processor platforms, etc. Various operating systems can be used including UNIX, Solaris, Linux, Windows, Macintosh OS, and other suitable operating systems.

For post-processing the images and scans as taken by the camera(s) 9(i), a similar arrangement as the one in FIG. 3 will be used, be it that that one will not be located in the car 1 but may conveniently be located in a building for off-line post-processing. The Images and scans as taken by camera(s) 9(i) are stored in one or more memories 312-315. That can be done via storing them first on a DVD, memory stick or the like, or transmitting them, possibly wirelessly, from the memory 9.

Figure 4:
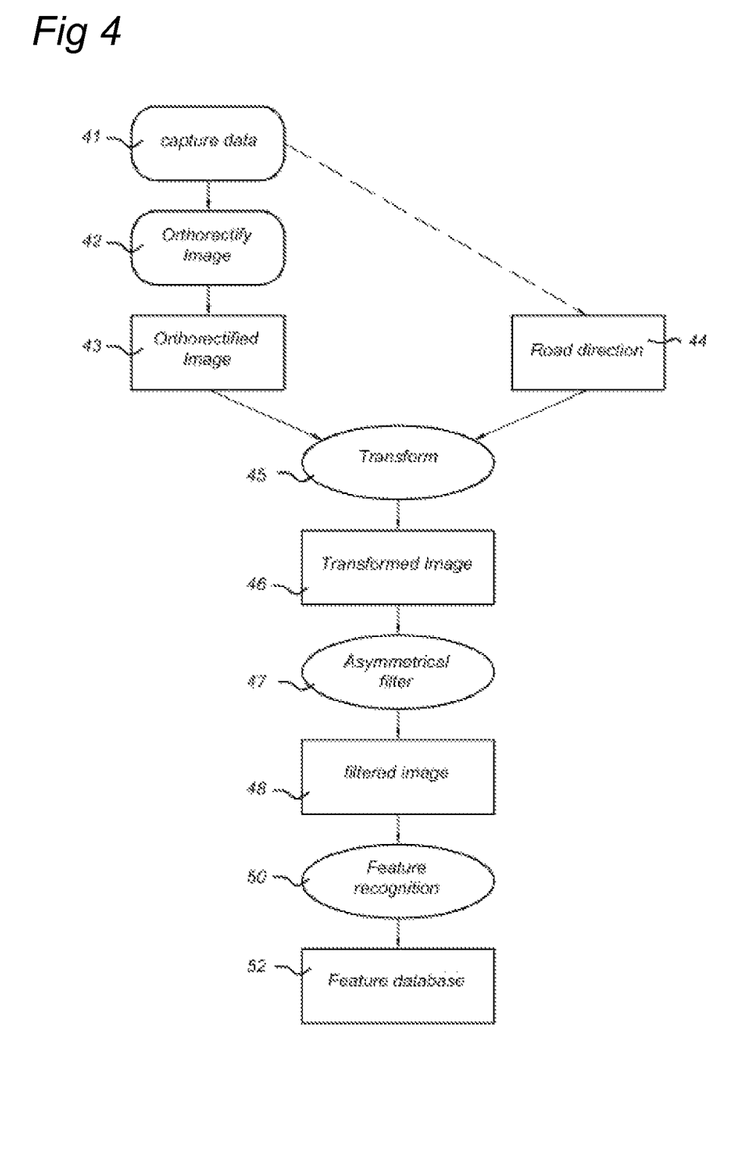
FIG. 4 is a flow diagram of an exemplar implementation of the process for producing lane information according to the invention.

FIG. 4 shows a flow chart of an exemplary embodiment of the process of producing lane information according to the invention. The process starts with an MMS (Mobile Mapping System) Session 41, by capturing sequences of source images with associated position and orientation data in a coordinate reference system by means of a mobile mapping vehicle as shown in FIG. 1 and storing the captured data on a storage medium. In process block 42, the captured data is processed to generated an orthorectified tile for each source image with metadata corresponding to associated position and orientation data in the coordinate reference system. The orthorectification process removes image distortions introduced by the collection geometry and the terrain, and resamples the imagery to a uniform ground sample distance and user-specified map projection. The associated position and orientation data includes the position signals that can be obtained from the GPS, DMI and IMU and the position and orientation of the respective cameras relative to the position and orientation of the car. The generation of an orthorectified tile from a source image will be described below in more detail. The position and orientation data enables us to superpose orthorectified images, comprising a similar part of the road surface so as to obtain an orthorectified mosaic. The orthorectified image 43 could be an orthorectified image generated from only one source image or could be a mosaic of orthorectified images, representing for example a straight road segment varying from 10-100 meters.

Furthermore, from the captured data the driving direction of the Mobile mapping vehicle on the road can be derived. As a vehicle is driving on the road surface, the driving direction is substantially parallel to the direction of the road. In this case the driving direction is an estimation of the direction of the road. The road direction is indicated by block 44.

It should be noted that the method according to the invention could be applied to any geo-referenced orthorectified image, for example aerial or satellite orthorectified images assuming that the resolution of the images is sufficient to detect the lane information. Furthermore the direction of the road can be retrieved from commercially available map databases. However, as a mobile mapping vehicle records simultaneously both the image data and position and orientation data of the vehicle, this data enables us to select, more accurately than is possible when done with the aerial or satellite images, the image parts comprising the road surface in the images and to calculate very accurately the position in the coordinate reference system.

A method of generating orthorectified images and associated metadata defining the position and orientation data of the orthorectified image is disclosed in unpublished patent application PCT/NL2006/050252. This method enables us to generate very accurate geo-coded orthorectified images from Mobile Mapping System data only. The geo-coded images have a pixel resolution of 8 cm (=relative position accuracy within the image) and the metadata defining the position and orientation of the image on the earth surface has an absolute geo-position accuracy of 1 meter and 0.1 deg. respectively.

In block 45 the road direction is used to transform the orthorectified image 43 into a transformed image 46. In an embodiment the road direction corresponds to the driving direction of a mobile mapping vehicle. In another embodiment the road direction is derived from the aerial or satellite image. An in yet another embodiment, the road direction is derived from data in a digital map database. The transformation at block 45 is used to normalize the orthorectified images. In the transformed image 46, the direction of the road and the resolution are normalized. Normalized means that in the transformed images 46, the road has a predefined direction and each pixel of the transformed image represents a fixed predefined physical area of the earth surface. This enables us to apply only one set of simple asymmetrical filters on the transformed images. The pixel size is adjusted in a normalization process, that could be part of the orthorectification process, to get the pixels scales to be consistent. The road direction is normalized by rotating the orthorectified image. Preferably, the road direction is parallel to a column of pixels in the transformed image. The transformed image comprises associated position and orientation data. The position and orientation data enables a process to determine in the transformed image for each pixel the corresponding geo-positions in a predefined coordinate system.

In block 47 an asymmetrical filter is performed on the transformed image to obtain a filtered image 48. An exemplar embodiment of the filter will be described below. It has been found that one set of asymmetrical filters can be used for each country as in each country, the road markings have standardized predefined dimensions. By knowing the dimensions of the road markings in the images, the filters can be optimized for said dimensions. Dimensions of the road marking can be the width of lane markings and the length of dashed lane dividers, wherein the length and width are defined in number of pixels in the transformed image. In an embodiment, a pixel corresponds to a physical area of the earth surface of 8 by 8 cm. A dashed line, which is typically 3 m long and 20 cm width, will have a length of 37 pixels and width of 2-3 pixels in the transformed image.

The objective of the asymmetrical filtering, which is in the example given above a combination of first, second and third filter, is to intensify the information searched for and to reduce noise in the transformed images. Some examples of intensification are: magnification of the size and brightening/darkening of the pixel values. Both the intensification and noise-reduction improve the feature recognition in the filtered images.

In block 50, the feature recognition is performed. The used feature recognition algorithm is not an essential feature of the invention. The features to be detected are substantially vertical lines or rectangles in the filtered images. The lines can be dashed lines, solid lines, solid double lines or any other straight line in the filtered images. One skilled in the art knows which algorithms are suitable to detect the features. The algorithm has to find and detect solid lines or rectangles in the filtered images. After detecting a feature in the filtered images, a procedure determines the x,y position of the feature in the filtered image. As the filtered image corresponds to the transformed image which comprises associated position and orientation data, the geo-position of the features can be derived from the position and orientation data associated with the transformed image. The width of roads and lanes can be computed by detecting first two or more solid or dashed parallel lines in the filtered image. The distance between the parallel lines in the images can be translated to a distance between lines by using the position and orientation data. The recognized features and associated position data are stored in a database for use in a digital map database.

Figure 5:
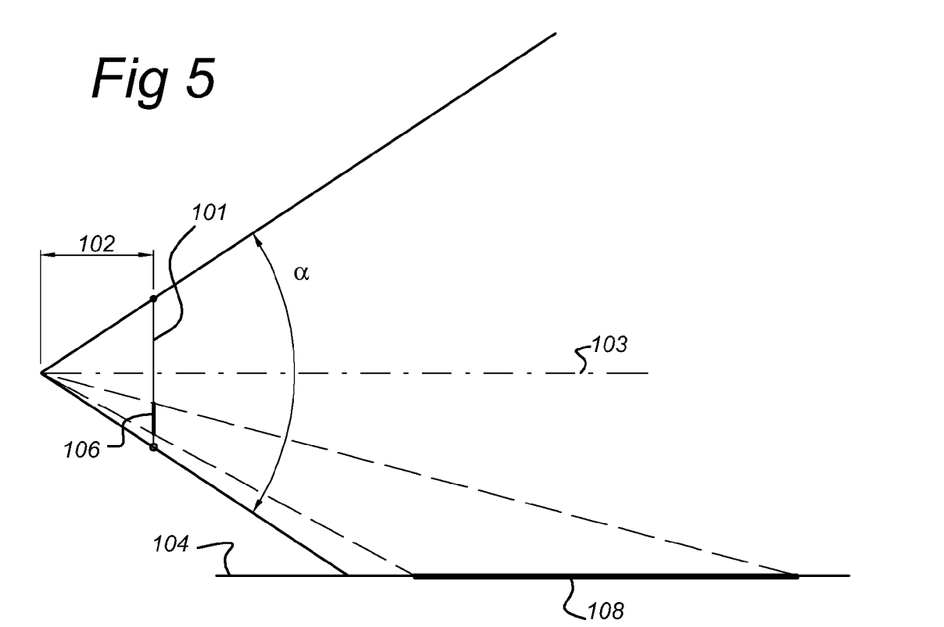
FIG. 5 shows a side view of the general principle of conversion of source images into orthorectified tiles.

FIG. 5 shows a side view of the general principle of conversion of a source image into orthorectified tiles which is performed in block 42. An image sensor 101 in a camera or CCD-camera 202 (shown in FIG. 6) records a sequence of source images. The source images represent more or less vertical images which are recorded by a terrestrial based camera 9($i$) mounted on a car as shown in FIG. 1. The source images could be a sequence of still pictures recorded by means of a still picture camera, which camera is triggered every displacement of e.g. 8 meters. A camera comprising the image sensor has an angle of view, $\alpha$. The angle of view $\alpha$ is determined by the focal length 102 of the lenses of the camera. The angle of view $\alpha$ could be in the range of $45°<\alpha<180°$. Furthermore, the camera has a looking axis 103, which is in the centre of the angle of view. In FIG. 1, the looking axis 103 is parallel to a horizontal plane 104. The image sensor 101 is mounted perpendicular to the looking axis 103. In this case, the image sensor 101 records "pure" vertical source images. If further the height of the image sensor is known with respect to a horizontal plane, e.g. the earth surface, the image recorded by the image sensor 101 can be transformed to an orthorectified tile representing a scaled version of the orthorectified view of the horizontal plane. To obtain a horizon image with a suitable resolution in the horizontal direction, a limited area of the image sensor is used. FIG. 5 shows the part 106 of the image sensor 101 that corresponds to the part 108 in the horizontal plane. The minimal acceptable resolution of the orthorectified tile determines the maximum distance between the image sensor and the farthest point in the horizontal plane. By means of geometry the source image retrieved from the terrestrial based camera can be converted to any virtual plane. Even if the looking axis is angled with a known angle with respect to the horizontal plane, an orthorectified tile can be obtained from a source image.

Figure 6:
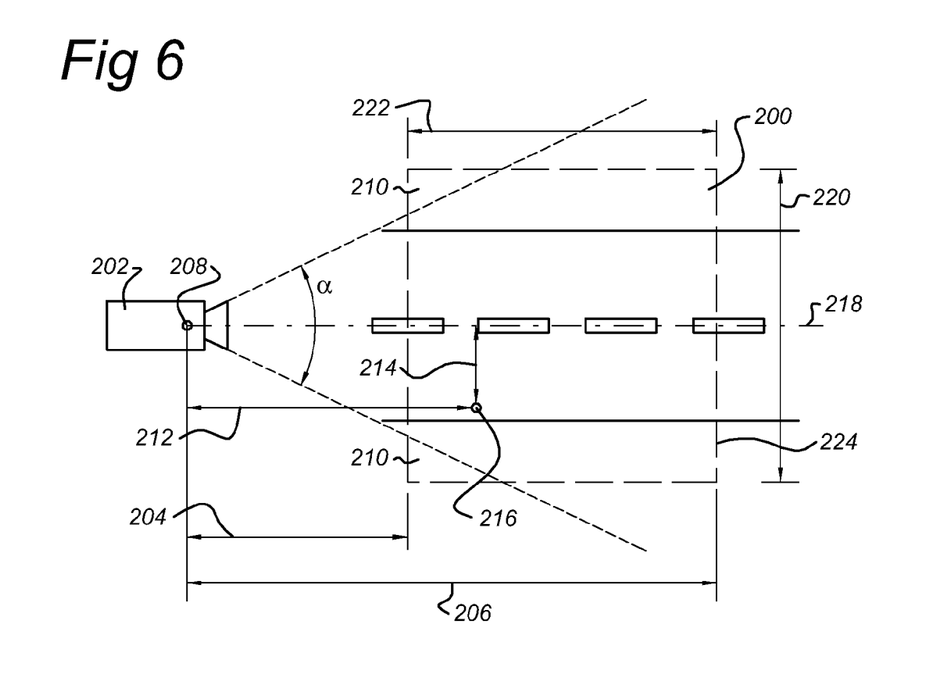
FIG. 6 shows a top view of the general principle of conversion of source images into orthorectified tiles.

FIG. 6 shows an orthorectified view of the general principle of conversion of a source images into an orthorectified tile 200. The viewing angle $\alpha$ and the orientation of the looking axis 103, 218 of the camera 202 determine the part of the horizontal plane that is recorded by the image sensor 101. The border of the orthorectified tile 200 is indicated by reference 224. In FIG. 6, the looking axis 218 of the camera 202 coincides with the direction centre axis of the vehicle which in turn corresponds with lane markings of the road. Collection of the attributes necessary for navigation systems and the like and their positional accuracy require a predefined minimum resolution of the orthorectified tiles. These requirements restrict the part of the horizontal plane that could be obtained from the source images. The maximum distance 206 between the position of the camera focal point 208 with respect to the horizontal plane and the boundary of the area of the horizontal plane determines the minimum resolution. Furthermore, practically, the maximum distance 206 could be restricted by the minimum distance between two cars when driving on a particular road. By limiting the maximum distance thusly, it has the advantage that in most cases the road surface in the orthorectified tile does not comprise the back of a car driving in front of the mobile mapping vehicle. Furthermore, the difference between maximum distance 206 and minimum distance 204 determines the maximum allowable distance between subsequent recordings of images by a camera. This can define the capture frame rate and could restrict the maximum driving speed of the vehicle. A rectangle of the horizontal plane corresponds to an area approximately having the form of a trapezoid in the source image. From FIG. 6 can be seen that the minimum distance and the angle of view α determine whether the orthorectified tile 200 comprises small area's 210 which do not have corresponding area's in the source image. The orthorectified tile 200 is the dashed square and the small area's 210 are the small triangles cutting off the close-in corners of the dashed square indicated by 200.

In an embodiment the orthorectified tile 200 corresponds to an area of 16 m width 220 and 16 m length 222. In the event the images are captured each 8 meter, 99% of road surface could be seen in two consecutive images. For roads wider than 16 m a front looking camera and side looking cameras have to be used to generate an orthorectified tile for said roads width. The parts of road that could not be retrieved from the images captured by a front looking camera are retrieved from the images captured by side looking cameras. A side looking camera can be any camera having an oblique looking axis or perpendicular looking axis with respect to the direction of the vehicle. The orthorectified tile 200 is now a mosaic of orthorectified images obtained from the front and side looking cameras. For further processing of the orthorectified tiles it is advantageous to have orthorectified tiles in the form of a rectangle. The pixels of the orthorectified tile which do not have an associated pixel in the source image will be given a predefined color value. An example of a predefined color value is a color corresponding to a non-existing road surface color or a value which will generally not be present or almost not present in source images. This reduces the possibility of errors in the further processing of the orthorectified tiles.

In an embodiment of the conversion of the source image to obtain the orthorectified tile for each pixel 216, having a distance 214 from the looking axis and a distance 204 from the focal point 208, the corresponding position in the source image is determined by means of geometry which is described in more detail in unpublished patent application PCT/NL2006/050252, which is incorporated herewith by reference. It should be noted that resolution (physical size that each pixel represents) is changed (made larger) when converting the source image to the orthorectified image. The increase in size is done by averaging the color values of the associated pixels in the source image to obtain the color value of the pixel of the orthorectified image. The averaging has the effect of clustering the road surface color sample and reducing noise within the process.

Figure 7:
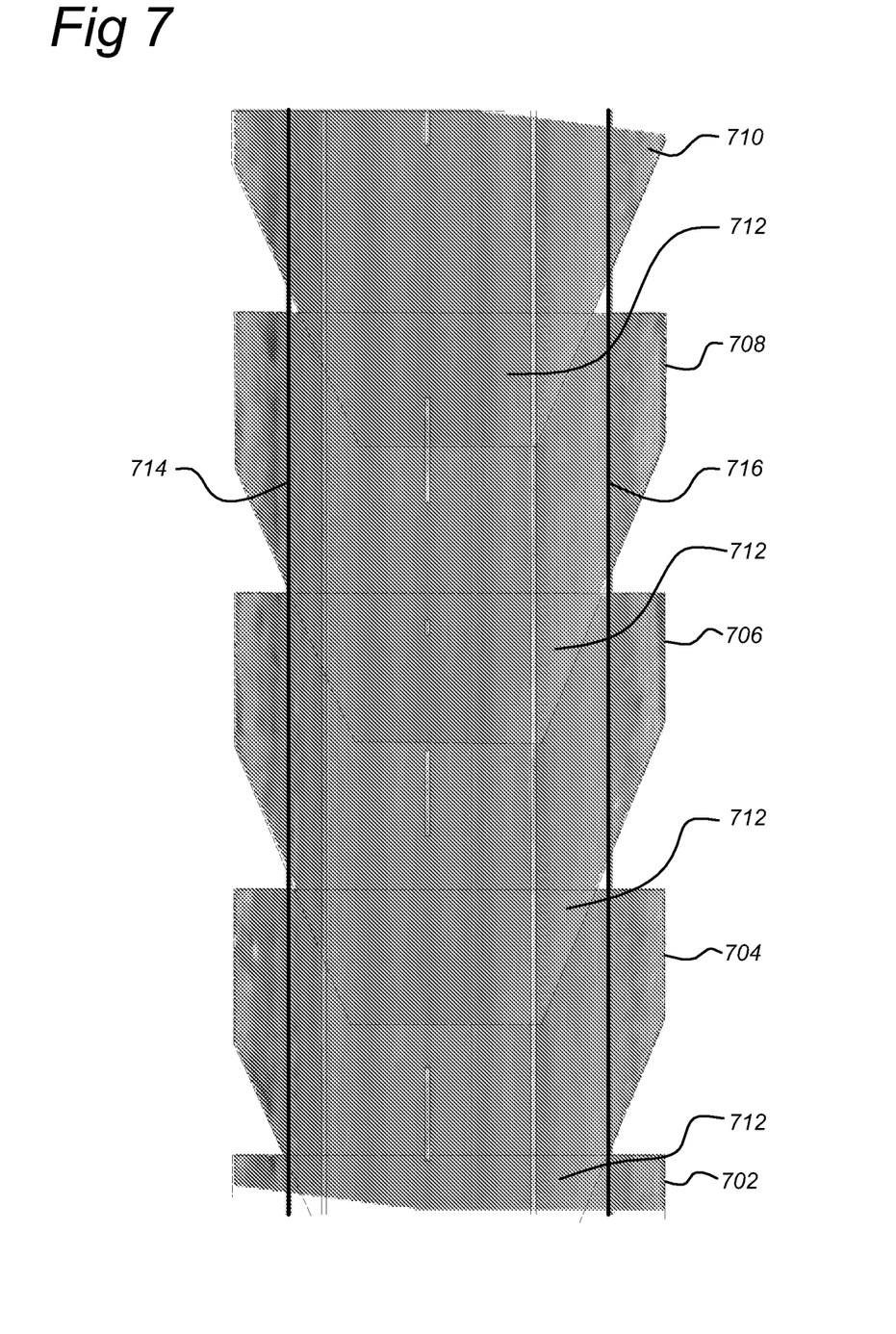
FIG. 7 shows an orthorectified image of a road segment.

Each orthorectified image is stored with associated position and orientation data. By means of the position and orientation data in a coordinate reference system, the geo-position of each pixel of an orthorectified image is defined. The position and orientation data enables a processor to superpose orthorectified images to obtain a larger orthorectified image or orthorectified mosaic. FIG. 7 shows an orthorectified image of a road segment, which has been obtained by superposition of 5 orthorectified images 702 . . . 710. The superposition could be based on the metadata of the respective orthorectified tiles. The metadata of each orthorectified tile is derived from a position determination function including the GPS-position from the moving vehicle, the driving direction or orientation of the moving vehicle, the position of the camera on the moving vehicle and the orientation of the camera on the moving vehicle. The parameters to derive the geo-position of an orthorectified tile are stored as position and orientation data associated with a source image. The pixel values in overlapping areas 712 could be obtained by averaging the pixel values of overlapping pixels or by choosing a value of one of the overlapping pixels. In an embodiment, the pixel value is chosen from the image in which distance between the geo-position corresponding to a pixel is nearest to the geo-position of the camera capturing said image. In this way, the best resolution in the combined orthorectified image of a road segment is preserved.

FIG. 7 shows further the lines 714, 716 corresponding to the left and right side of the road surface. These sides could be detected by a method disclosed in unpublished international patent application PCT/NL2007/050159, which is incorporated herewith by reference. Detection of the left and right side of the road surface is used to reduce the number of pixels to be processed for finding horizontal lane information. FIG. 7 shows a two lane roadway and a side space. FIG. 7 can be obtained by processing the images obtained from one front looking camera. To obtain a roadway of five lanes, more than one camera is needed. An orthorectified mosaic of a roadway of five lanes can be obtained by processing the image sequences generated by one or two front looking cameras, and two side looking cameras.

FIG. 7 shows in the middle of the road segment a small area with a color value similar to the color value of the dashed line. The selected size of the filters to be used will determine whether the small area will be removed or emphasized in the filtered image.

Figure 8:
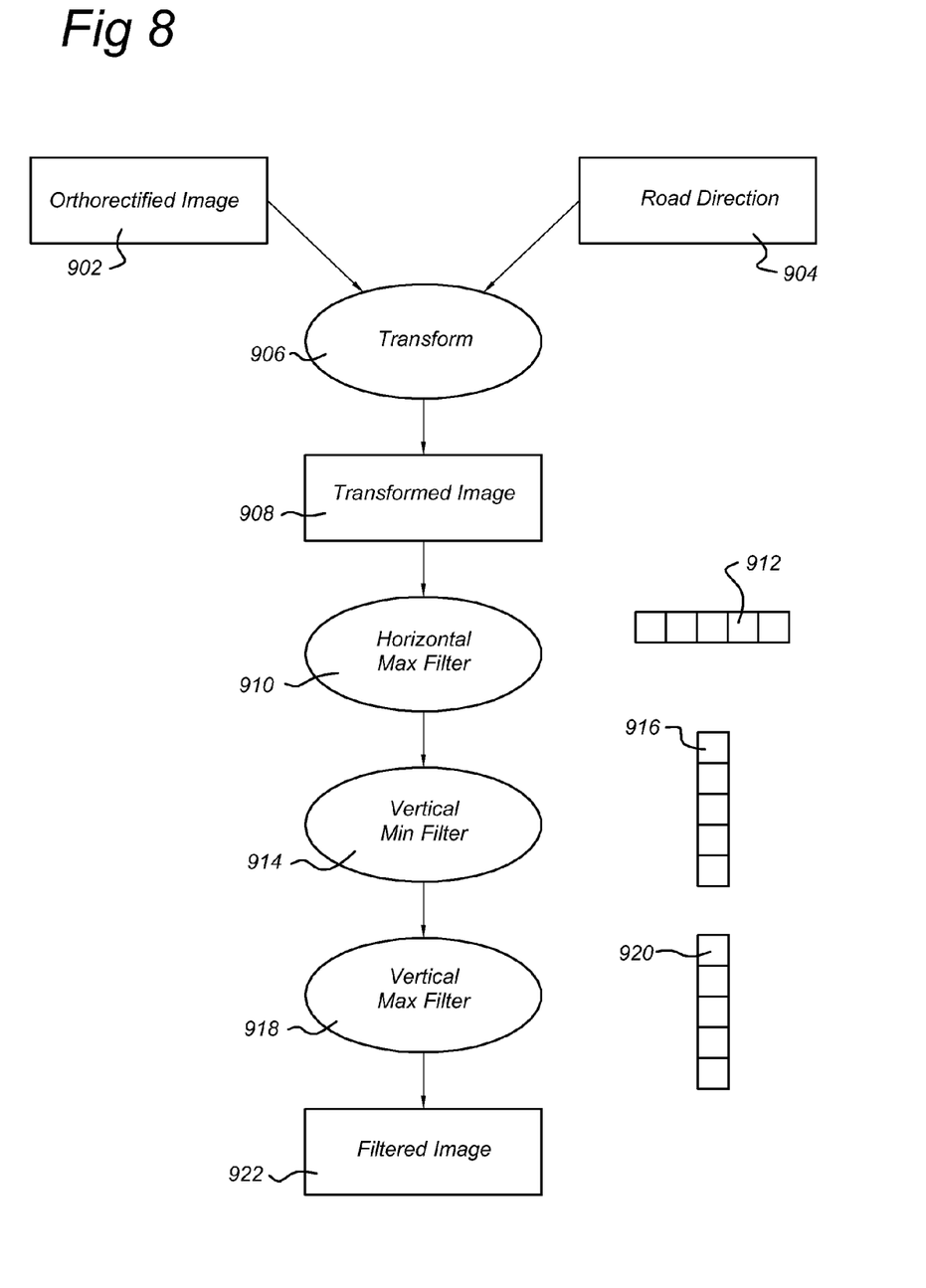
FIG. 8 shows an flow diagram of an exemplar embodiment of the asymmetric filtering.

FIG. 8 shows a flow diagram of an exemplar embodiment of the process of the asymmetric filtering. The sizes of the filter masks in FIGS. 8 and 9 have been chosen for explanation reasons only. A skilled person will select suitable sizes depending on the circumstances and requirements. Input of the process are an orthorectified image 902 of a road segment with associated position and orientation data and data 904 defining the direction of the road segment. The orthorectified image 902 represents a substantially straight part of a road. The road can have any arbitrary orientation and position in the orthorectified image 902. The data 904 defining the direction of the road segment, describes the geo-position and orientation of the road in a predefined coordinate system. By combining the position and orientation data associated with the orthorectified image and the data 904, the orthorectified image can be transformed into a transformed image 908 wherein the direction of the road is parallel to a column of pixels. The transformation process is indicated by process block 906. The transformation process performs at least a rotation function on the orthorectified images. In case the resolution of the orthorectified images varies between images, the transformation process further comprises a scaling function, which enables the transformation function to obtain transformed images all having the same resolution. Furthermore, the transformation process calculates associated position and orientation data. The associated position and orientation data defines the relationship between the position of a pixel in the image and the corresponding geo-position. This enables us to determine for recognized lane information in the transformed images the real dimensions and position of the lane information. By means of the transformation process, normalized orthorectified images are obtained with corresponding position and orientation data.

The transformed images have typically noisy data not only due to the noise of the camera, but also due to scratches and spots that appear on the road surface. As such, it is relatively difficult to extract lane information from the images, especially when the direction of the road in the image is not known.

Normally, such images are filtered with filters having a symmetrical filter mask or two-dimensional window. A filter transforms one image into another image based on a specific function. Such a function is outputting for each pixel of the input image a value of the corresponding pixel in the new image that is computed as a combination of neighboring pixel values. Neighboring pixels that are taken into account form the so called filter mask. A symmetrical filter mask has the advantage that filtering function performed on the image is equivalent in horizontal and vertical direction. Filters with a symmetrical filter mask are very useful in image processing for improving images, wherein the orientation the objects is not known. Examples of improvements are touching up features of object to be recognized (e.g. edges of object in image), smoothing noise, etc. Symmetrical morphological filters are commonly known to persons skilled in the art. Morphological filters contribute a wide range of operators to image processing, all based around a few simple mathematical concepts from set theory. The operators are particularly useful for the analysis of binary images and common usages include edge detection, noise removal, image enhancement and image segmentation. Some types of morphological filters are dilation, erosion, opening, closing.

As the orientation of the objects to be recognized in known, namely parallel to a column of pixels, asymmetrical filters can be used to filter the images prior to recognition of the desired information from the images. The asymmetrical filtering is a data preparation or data conditioning step applied prior to the actual feature detection or recognition step. For the implementation of lane information recognition, filters are used to magnify the desired information, and reduce noise in the same time. The lines according to the lane information in the filtered image could be recognized by for example the Hough Transform.

Figure 9:
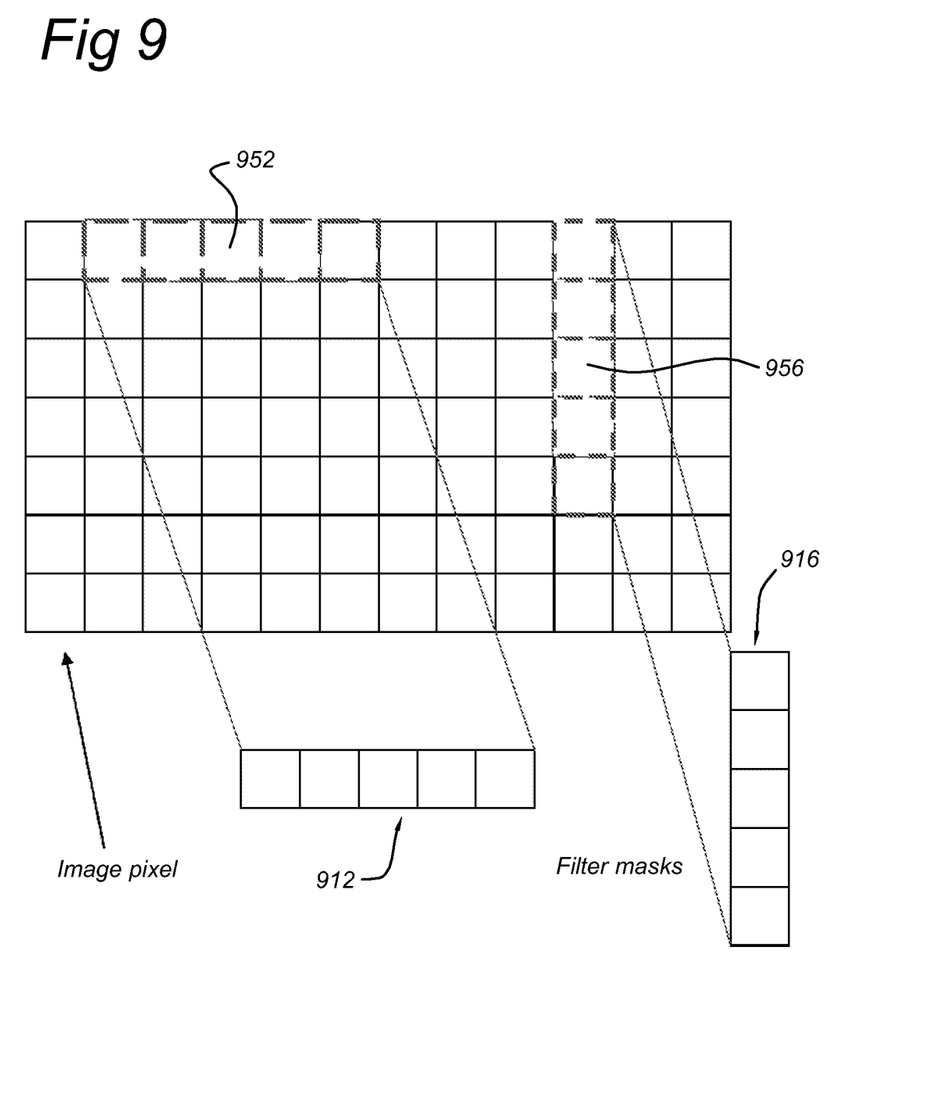
FIG. 9 shows exemplar embodiments of the filters masks.

The transformed image 908 is supplied to a horizontal filter 910 to obtain a horizontal filtered image. A horizontal filter is a filter having an asymmetrical filter mask or a one-dimensional window, wherein the mask or window encompasses only three or more neighboring pixels in a row of pixels. The horizontal filter could have a filter mask 912 as shown in FIG. 9. Filter mask 912 has a window corresponding to 5 neighboring pixels in a row of pixels. When calculating an output value with filter mask 912, the value will be assigned to the pixel 952 in the associated horizontal filtered image. The position of pixel 952 in the horizontal filtered image is similar to the position in the transformed image. The output value will thus be assigned to the pixel in the middle of the window defined by the horizontal filter mask 912. In an embodiment, the horizontal filter is a maximum filter. A maximum filter is a filter wherein the output value corresponds to the value of the pixels according to the mask having the maximum value. In an embodiment, the maximum value corresponds to the pixel value having an RGB-value that corresponds to the highest brightness.

An algorithm to perform the maximum filter for a pixel of an input image could be described as follows:
compute for each pixel in the mask the brightness from RGB-value,
find pixel in the mask having the highest brightness,
retrieve RGB-value corresponding to brightest pixel, and
assign RGB-value to output of filter.

This filter is applied to all pixels for the entire image.

The horizontal filter 910 corresponds to a filter having a structuring element which enlarges the width of a line in a direction perpendicular to the driving direction of the vehicle. A structuring element is a small grid representing pixels and is applied to images to change the structure of the image content Next, the horizontal filtered image is supplied to a first vertical filter 914 to obtain a vertical filtered image. A vertical filter is a filter having an asymmetrical filter mask or a one-dimensional window, wherein the mask or window encompasses only three or more neighboring pixels in a column of pixels. The first vertical filter 914 could have a filter mask 916 as shown in FIG. 9. The filter mask 916 has a window corresponding to 5 neighboring pixels in a column of pixels. By means of the filter mask 916, a value will be generated for the pixel 956 corresponding to the pixel in the window covered by the vertical filter mask 916. In an embodiment, the first vertical filter is a minimum filter. A minimum filter is a filter wherein the output value corresponds to the value of the pixels according to the mask having the minimum value. In an embodiment, the minimum value corresponds to the pixel value having an RGB-value that corresponds to the lowest brightness, or darkest pixel.

An algorithm to perform the minimum filter for a pixel of an input image could be described as follows:
compute for each pixel in the mask the brightness from RGB-value,
find pixel in the mask having the lowest brightness (darkest pixel),
retrieve RGB-value corresponding to darkest pixel, and
assign RGB-value to output of filter.

This filter is applied to all pixels for the entire image.

The first vertical filter 914 corresponds to a filter having a structuring element which reduces the length of a line in a direction parallel to the driving direction of the vehicle. Optionally the vertical filtered image obtained from the first vertical filter 914 is supplied to a second vertical filter 918 to obtain the filtered image 922. The second vertical filter 918 has a filter mask 920 as shown in FIG. 9. Said filter mask 920 has a window corresponding to 5 neighboring pixels in a column of pixels. In an embodiment the second vertical filter 918 is a maximum filter.

The second vertical filter 918 corresponds to a filter having a structuring element which enlarges the length of a line in a direction parallel to the driving direction of the vehicle.

Asymmetrical filters can be applied on the transformed image as the orientation of the lane information in the transformed image is known. The horizontal filter magnifies the width of the lane information in horizontal direction of the images, thus along a row of pixels. In RBG-space the lane markings have a brighter color than the road surface material. The maximum filter will stretch the width of the lane information with m−1 pixels, wherein m is the number of neighboring pixels of the filter mask. For example, a vertical line with a width of one pixel will become a vertical line with m pixels. Furthermore the maximum filter reduces the noise along the rows of pixels in the images.

The first vertical filter which is a minimum filter reduces the noise along the rows and removes one or more pixels having a relative bright color value but which could not represent lane information. The first vertical filter will reduce the vertical size of lane information with n−1 pixels, wherein n is the number of neighboring pixels of the filter mask. The value of n should be smaller then the length in pixels of the smallest line segment to be detected. It has been found that values for n in the range 10-25 pixels are very suitable for filtering dashed lines with a length of 3 m in images having a pixel size of 8×8 cm.

The small area in the middle of the road segment shown in FIG. 7 will be removed if n has a value larger then the maximal vertical length in pixels of the small area. The line width of the dashed line in FIG. 7 is 2 pixels. The length of the small area is 8-9 pixels. Therefore the small area will be removed with n=10.

Optionally, the second vertical filter which is a maximum filter reduces further the noise but also restores the vertical size of the lane information if the size of the filter mask is similar to the size of the first vertical filter. This option is necessary if the length of the lane information has to be determined accurately.

By means of the horizontal filter 910 and the first vertical filter 912 a filtered image is obtained wherein accurately can be determined the position of the lane information parallel to the road direction, e.g. defined by the track of a vehicle or centerline. The filtered image obtained by filtering with the asymmetrical filter masks is very suitable for further recognition of lane information. The width of the lane information is enlarged, whereas the position of the centerline of the lane information remains unchanged. Furthermore, the lane information and road surface is noise-reduced without losing important information.

To determine accurately the length of lane information, such as individual lines of a dashed line, the size of the filter mask of the first vertical filter should be similar to the size of the second vertical filter. However, by knowing the size of the first vertical filter 914, the length of lane information derived from an output image of the first vertical filter could be corrected accordingly. Similarly, the width of the lane information can be found by correcting the width found in the filtered image independence of the size of the horizontal filter.

The number m of neighboring pixels of the mask of the first vertical filter should be smaller than the line segments in the transformed images we are looking for. Otherwise lane information will be removed erroneously.

The number n of neighboring pixels of the mask of the horizontal filter depends on the size of the first vertical filter and the deviation of the road direction with respect to the direction of the lane information to be detected. The track of the mobile mapping vehicle could be used as an estimation of the road direction. However, if the vehicle changes lanes, the direction of the vehicle will deviate from the real direction of the road. The deviation will result in a wrongful transformation, meaning a wrongful rotation, of the orthorectified image. The lane information will not be parallel to the columns of pixels but will have an angle corresponding to the deviation. The following equation defines the relationship between n and m:

$$\arctan\left(\frac{m+w-1}{n}\right) \geq \text{angle\_of\_vehicle}$$

wherein:
m is the size in number of pixels of the mask of the horizontal filter,
w is minimal width in pixels in the transformed images of lane information to be detected,
n is the size in number of pixels of the mask of the first vertical filter, and angle_of_vehicle (in degrees) is the maximal angle difference between the heading direction of the car and the actual direction of the road.

In an embodiment, the following values are applied: n=10, w=3 and m=4. These parameter values allow an angle_of_vehicle up to 30.9 degrees. The angle_of_vehicle for a straight driving vehicle is typically within 5 degrees. The angle_of_vehicle for a sudden lane changing can be up to 9 degrees. It might be clear that the values of angle_of_vehicle, n, w and m depend on the horizontal and vertical resolution of the transformed image.

The equation above describes the maximum allowable angle_of_vehicle. The angle_of_vehicle will correspond to the angle of the lane information in the transformed with respect to a column of pixels. When the vehicle is driving in on a curve of a road, the first and last pixel of a lane marking will also have an angle with respect to a column of pixels in the transformed image. Therefore, the equation above can also be used to determine the optimal values for m and n for a predetermined maximum amount of curvature. One skilled in the art can select the values m and n to optimize the filtering process for the conditions encountered regarding angle of vehicle and amount of curvature.

If the equation above is not complied with, lines could be split in more than one segment or the length of a line could be decreased erroneously. For one skilled in the art, it is further obvious, that m should be smaller than the minimum number of pixels between two parallel lines. Otherwise, those two lines will be joined and regarded as one line.

Figure 10:
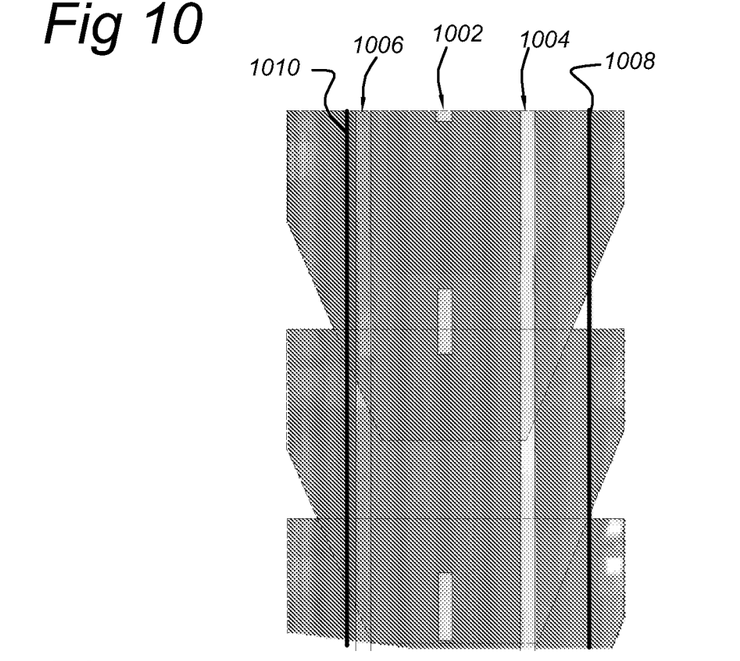
FIG. 10 shows a filtered image of a road segment.

FIG. 10 shows a filtered image of a road segment. The road segment has a resolution similar to the road segment shown in FIG. 7. FIG. 10 shows a dashed lane divider 1002 and solid left and right road side lines 1006, 1004 respectively. It can be seen that the asymmetrical horizontal and vertical filters magnify the width of the lane information. Furthermore, the pixel noise in the filtered image is reduced.

Figure 11:
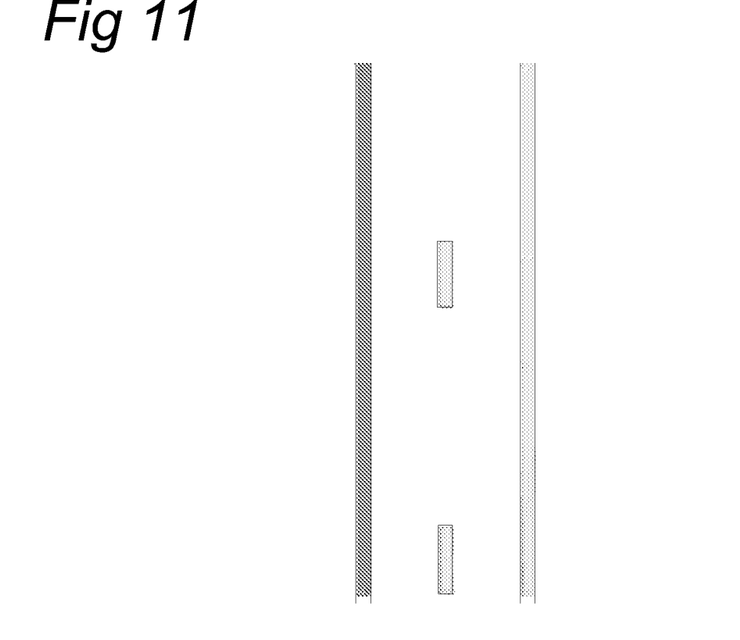
FIG. 11 visualizes the found features in the filtered image shown in FIG. 10.

The filtered image shown is FIG. 10 is applied to a line recognition method. To reduce the number of false detections, the area in the filtered image for recognizing lane information could be limited to the position of the left and right side 1010, 1008 of the road surface. As lane information is on the road surface only, the image areas outside the road surface can be discarded. The left and right side of the road surface could be determined by a method disclosed in unpublished international patent application PCT/NL2007/050159. A simple pattern matching algorithm to detect the lane information can be used as the lines have a strict shape. In the present application it is sufficient that the pattern recognition algorithm searches for only two types of patterns: solid lines and rectangles, which are parts of dashed lines. Furthermore, the color of the lines could be taken into account to determine the type of line. FIG. 11 visualizes the areas of the features found in the filtered image shown in FIG. 10. As the position of the left and right side of the road could be determined before analysis of the filtered image, the roadsides can be occluded from analysis. Therefore, the white spots at the right side of FIG. 10 are not recognized as lane information.

The embodiments described above all use an orthorectified image on which the transformation and asymmetrical filtering is performed. Orthorectified images could easily be combined to obtain an orthorectified mosaic of for example a road segment or a road with more than five lanes. It should be noted that instead of generating orthorectified images of 16 m×16 m from the source images, top view images can be generated. A top view image is an image wherein each pixel is seen from above in one point. A camera with a looking axis perpendicular to the earth surface will provide a top view image. The processing of top view images by means of the method according to the invention will provide filtered images that are very suitable for the recognition of lane information. By knowing the used projection, the geo referenced position of the lane information can be derived accurately from an asymmetrical filtered top view image.

As said above aerial or satellite orthorectified images could be used to generate lane information. Now, the road for which the lane information has to be determined is sampled. Each sample has a position and an orientation in a coordinate reference system. For each sample, the pixels of the aerial or satellite image corresponding to an area around said pixel, for example 20 m×20 m, are first transformed into an image wherein each column of pixels of the transformed image corresponds to a surface parallel to the direction of said road. Subsequently, said transformed image is asymmetrically filtered.

It should further be noted that the images as collected in the Mobile Mapping Vehicle need not be geo-referenced for the purpose of applying the asymmetric filter or even for the lane recognition step. The cameras are mounted on the vehicle. Therefore the orientation of the cameras with respect to the driving direction is known. This allows us to generate the filtered images and detect features in said images without geo-referenced position and orientation data. An inertial navigation systems (INS) enables us to derive for each detected feature relative position information in a coordinate reference system. Some form of geo-referencing is needed of sufficient accuracy to match the detected lane information to the appropriate road in the map database. Such geo-referencing and map matching is well known in the art.

It should also further be noted that geo-referencing of sufficient accuracy is needed for aerial and satellite images so that the road position and orientation from the proper road can be used to determine where on the image and at what orientation to apply the method according to the invention and then to associate the resulting lane information back to the appropriate road in the map database.

The present invention works on tiles corresponding to a pre-selected length of a road. From images taken by a mobile mapping vehicle, images having 16 m length of a road can be generated. A very curvy road is a road that has a radius up to 100 m. In showing the 16 meter in front of the car, the arc of such a curved lane marking will have 10 degree deviation between the starting point and ending point. However, the applied asymmetrical filter should be big enough to eliminate assumed level of noise but should always be small enough not to eliminate lane markings we are looking for. The smallest lane marking we are looking for is a dashed line. A dashed line is typically 3 m long. Therefore, the size of the filter should be smaller then 3 m in real world coordinates. In a suitable embodiment the size of the first vertical filter is 25 pixels. With a pixels size of 8×8 cm, this corresponds to a filter with a length of 2 m. The deviation of an arc over 2 m will vary only by 1-2 pixels. This deviation does not introduce problems when using the method according to the invention on curvy roads.

Similarly lane changing does not introduce problems. When driving with a speed of 40 km/h and changing lane in 2 seconds, which is very fast, the vehicle moves forward 25 m and sideward 4 m. This corresponds to 9 degree deviation from road direction.

As described above, an orthorectified image of a road segment (e.g.) can be processed by the method according to the invention. The recognized road information is stored together with their type and position and if necessary dimensions in a database for use in a digital map database. The geo-position of the lane information can be derived from the position and orientation data associated with the transformed image. The position can be absolute in the form of a geo-position in a predefined coordinate system or relative with respect to the track of the vehicle or position of the road obtained from a database. Said position information of a road from a database is used to determine the direction of the road. The lane information can be used to produce a more realistic view of the road surface in a navigation system. For example, narrowing of a road from, for example, three lanes to two can be visualized. Furthermore, the lane information can be very useful for determining for example non parking/stopping areas and road segments in which passing other cars is forbidden. Also, as navigation gets more accurate, the location of vehicles within lanes can become part of the system for safety applications as well as finer directional prompts (move over to the left lane for your upcoming turn).

Needless to say, this accurate detection of lane markings and subsequent lane positions also enables the system to automatically determine the number of lanes and the width of lanes. This can be done by searching for two or more solid or dashed parallel lines in the filtered image. Subsequently, the number of lanes can be derived easily. Furthermore, the width of the corresponding lanes can be computed in dependence of the position and orientation data associated with the one or more source images.

The method described above could be performed automatically. It might happen that the quality of the images is such that the image processing tools and object recognition tools performing the invention need some correction. For example, the lane information of subsequent road segments could be analyzed for discontinuities along the road. For example, a pair of subsequent road segments could have different position and/or type information along the road. In that case the corresponding transformed images or orthorectified images could be reviewed by a human. Now, the method includes some verification and manual adaptation actions to enable the possibility to confirm or adapt intermediate results. These actions could also be suitable for accepting intermediate results or the final result of the lane information generation. By these actions the quality of the database comprising the lane information can be improved.

The lane information produced by the invention produces lane information for each orthorectified image and stores it in a database. The lane information could be further processed to reduce the amount of information. For example, the road information corresponding to images associated with a road section could be reduced to one parameter for the road width for said section. Furthermore, if the road section is smooth enough, a lane divider could be described by a set of parameters including at least the end points and shape points for said section. The line representing the lane divider could be stored by the coefficients of a polynomial. Or for a regularly positioned set of lanes, the lane information could be embodied in a width and offset from the centerline.

The foregoing detailed description of the invention has been presented for purposes of illustration and description. It is not intended to be exhaustive or to limit the invention to the precise form disclosed, and obviously many modifications and variations are possible in light of the above teaching. For example, by changing the horizontal maximum filter with a vertical maximum filter and the vertical minimum filter with a horizontal minimum filter, road information of road markings corresponding to lines perpendicular to the direction of the road can be generated.

Furthermore, the minimum and maximum filter could be replaced by any other kind of asymmetrical filter such as edge detection filter, image clustering filter, statistical filter. The transformation based on the estimated road direction provides a transformed image, wherein the features to be detected have a known orientation, i.e. vertical orientation for lane dividers. This enables us to use filters which are only effective in filtering an image in one direction, i.e. along a row of pixels of a column of pixels. This in contrast to symmetrical filters, which are able to detect features in images having any orientation. Therefore, any filter or combination of filters having a filter mask that is based on the orientation of the feature to be detected in the transformed image 46, can be used in the method according to the invention. The known orientation of the feature in the image enables us to use less complex filters compared to filters that have to be used if the orientation of the feature is not known in the image.

The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

The invention claimed is:

1. Method of producing lane information for use in a map database comprising:
   acquiring one or more source images of a road surface and associated position and orientation data, the road having a direction and lane markings parallel to the direction of the road;
   acquiring road information representative of the direction of said road;
   transforming the one or more source images to obtain a transformed image in dependence of the road information, wherein each column of pixels of the transformed image corresponds to a surface parallel to the direction of said road;
   applying a filter with asymmetrical mask on the transformed image to obtain a filtered image; and,
   producing lane information from the filtered image in dependence of the position and orientation data associated with the one or more source images;
   wherein the one or more source images have been obtained by:
   retrieving one or more image sequences obtained by means of one or more terrestrial based cameras mounted on a moving vehicle driving on the road and associated position and orientation data; and
   performing a normalization process on the one or more image sequences to obtain the one or more images and position and orientation data associated with said one or more images.

2. Method according to claim 1, wherein the road information is obtained from a map database.

3. Method according to claim 1, wherein the road information is obtained from tracking information generated by a positioning determination means mounted in a moving vehicle driving on the road.

4. Method according to claim 1, wherein the one or more source images are aerial or satellite images.

5. Method according to claim 4, wherein the images are orthorectified images.

6. Method according to claim 1, wherein said one or more cameras include at least one camera having a looking axis along the driving direction of the moving vehicle.

7. Method according to claim 1, wherein said one or more cameras include at least one camera having an oblique looking axis with respect to the driving direction of the moving vehicle.

8. Method according to claim 1, wherein said one or more cameras include at least one camera having a looking axis perpendicular to the driving direction of the moving vehicle.

9. Method according to claim 1, wherein the normalization process generates orthorectified images.

10. Method according to claim 1, wherein the tracking information and the associated position and orientation information of the one or more image sequences have been captured simultaneously from an output signal generated by a positioning determination means mounted in the moving vehicle.

11. Method according to claim 1, wherein transforming includes a rotation operation.

12. Method according to claim 1, wherein applying a filter with asymmetrical mask comprises:
    applying firstly on the transformed image a first filter having a structuring element which enlarges the width of a line in a direction perpendicular to the driving direction of the vehicle and secondly a second filter having a structuring element which reduces the length of a line in a direction parallel to the driving direction of the vehicle.

13. Method according to claim 12, wherein the first filter is a maximum filter and the second filter is a minimum filter.

14. Method according to claim 12, wherein applying a filter with asymmetrical mask further comprises:
    applying thirdly a third filter having a structuring element which enlarges the length of a line in a direction parallel to the driving direction to its original size.

15. Method according to claim 14, wherein the third filter is a maximum filter.

16. Method according to claim 1, wherein producing lane information comprises:
    searching for a solid line in the filtered image; and,
    calculating the position of solid line in dependence of the position and orientation data associated with the one or more source images.

17. Method according to claim 1, wherein producing lane information comprises:
    searching for a rectangle in the filtered image; and,
    calculating the position of rectangle in dependence of the position and orientation data associated with the one or more source images.

18. Method according to claim 1, wherein producing lane information comprises:
    searching for two or more solid or dashed parallel lines in the filtered image; and,
    computing the width of lanes from the position of the two or more solid or dashed lines in dependence of the position and orientation data associated with the one or more source images.

19. Method according to claims 1, wherein producing lane information comprises:
    searching for two or more solid or dashed parallel lines in the filtered image; and,
    computing the number of lanes from the two or more solid or dashed lines.

20. A computer readable non-transitory medium including program segments for, when executed on a computer device, causing the computer device to implement the method of claim 1.

21. An apparatus comprising:
    an input device;
    a processor readable storage medium;
    a processor in communication with said input device and said processor readable storage medium; and
    an output device to enable the connection with a display unit; said processor readable storage medium storing code to program said processor to perform the actions comprising:
    acquiring one or more source images and associated position and orientation data;
    acquiring tracking information of a vehicle driving on a road, the road having lane markings parallel to the direction of the road;
    transforming the one or more source images to obtain an transformed image in dependence of the tracking information, wherein the transformed image represents the road surface in front of the vehicle and each column of pixels corresponds to a surface parallel to the driving direction of the vehicle;

applying a filter with asymmetrical mask on the transformed image to obtain a filtered image; and producing lane information from the filtered image in dependence of the position and orientation data associated with the one or more source images;

wherein the one or more source images have been obtained by:

retrieving one or more image sequences obtained by means of one or more terrestrial based cameras mounted on a moving vehicle driving on the road and associated position and orientation data; and performing a normalization process on the one or more image sequences to obtain the one or more images and position and orientation data associated with said one or more images.

* * * * *